Patented Mar. 27, 1945

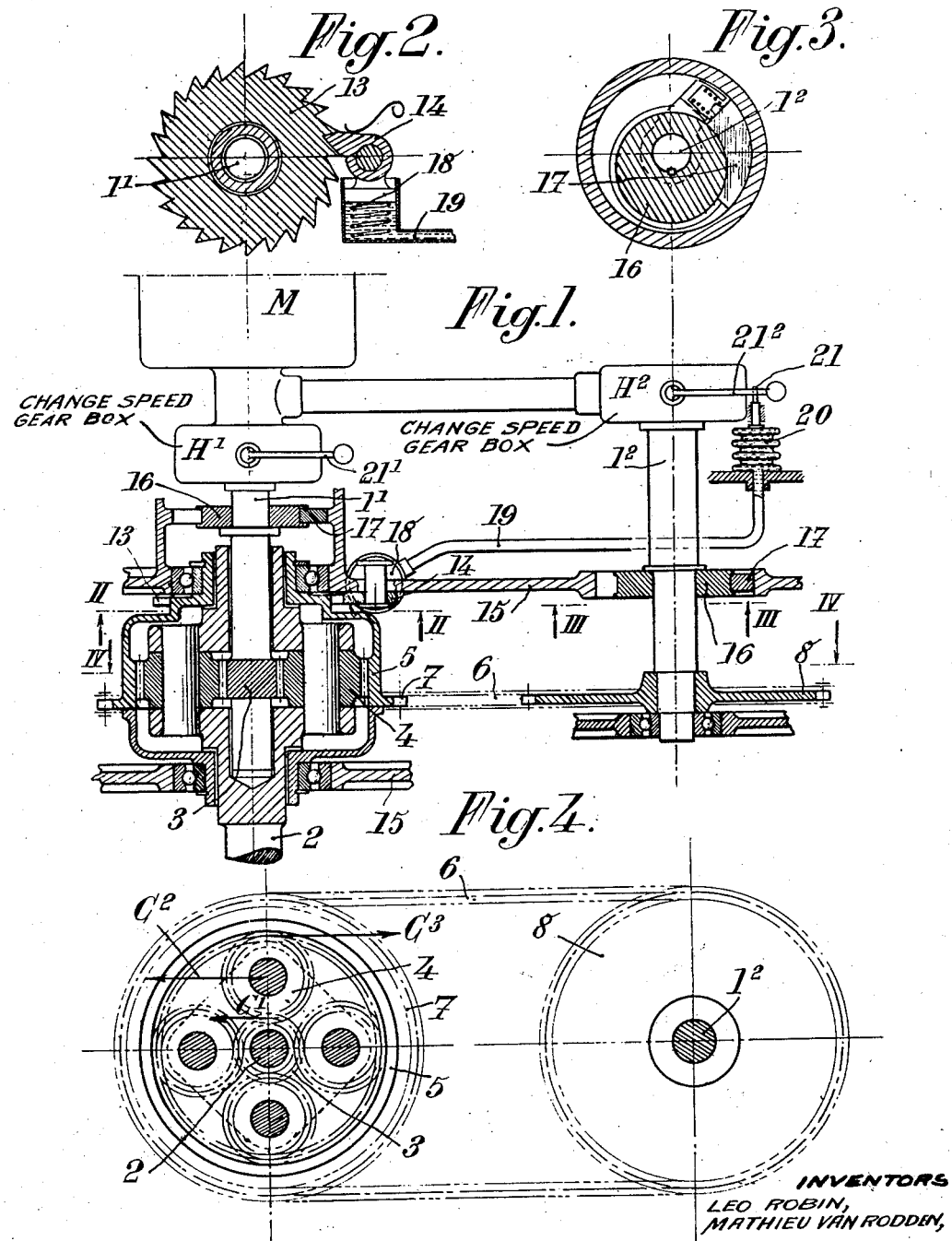

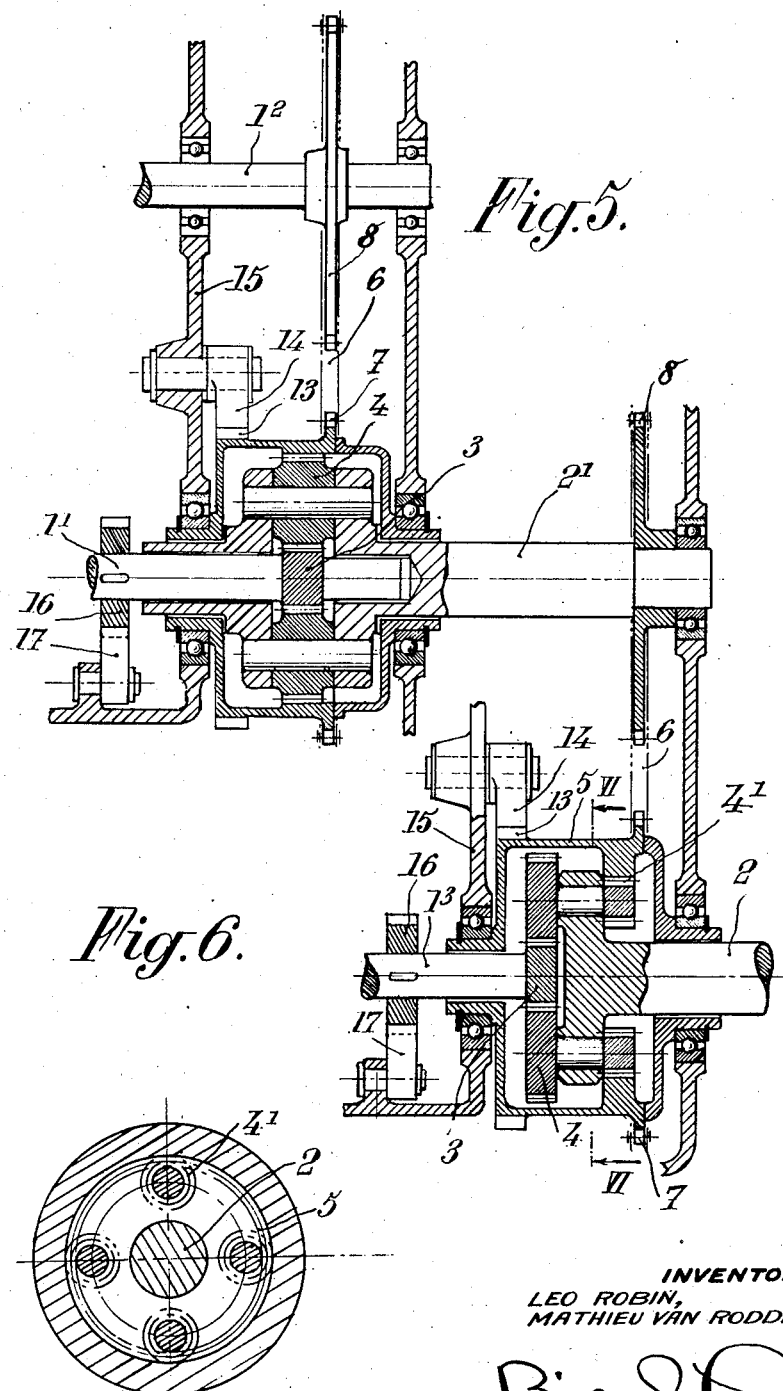

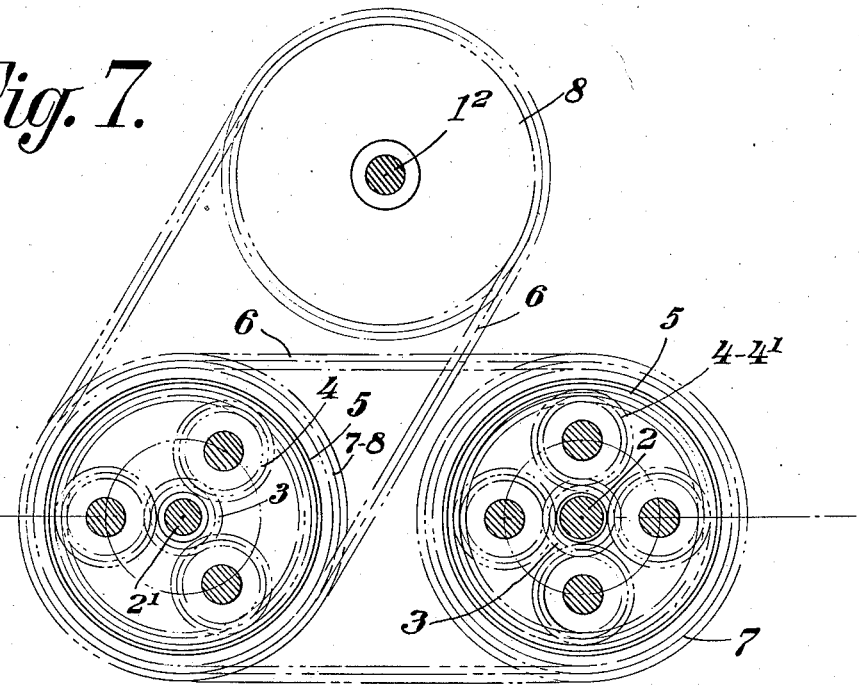
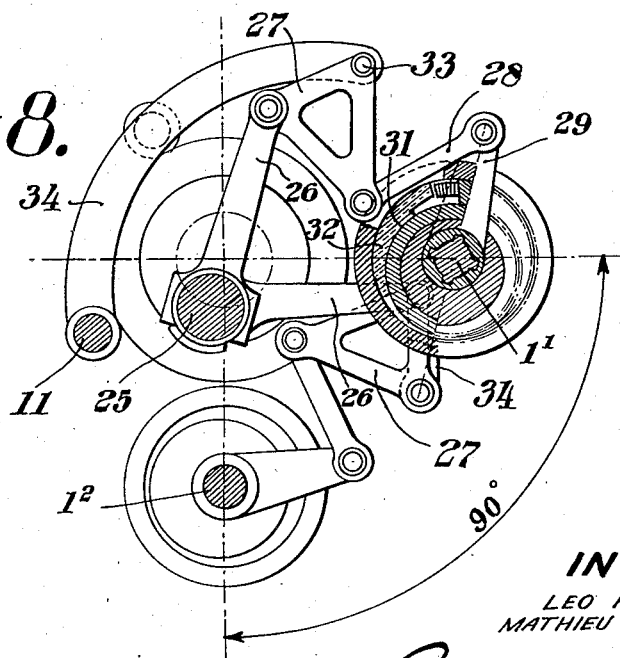

2,372,226

UNITED STATES PATENT OFFICE 2,372,226

TRANSMISSION DEVICE

Leo Robin and Mathieu van Roggen, Sprimont, Belgium; vested in the Alien Property Custodian Application December 13, 1939, Serial No. 309,100
In Belgium December 13, 1938

5 Claims. (Cl. 74—283)

The present invention relates to systems for transmitting torques from a driving mechanism to a driven mechanism, and it is more especially, although not exclusively concerned with systems of this type including change speed devices of the continuous or gradual type.

The chief object of the present invention is to provide a system of this type which is better adapted to meet the requirements of practice than those used for the same purpose up to the present time and in particular which is capable, when starting from a given driving mechanism, to increase the range of torques and speeds which can be obtained for the receiver mechanism, account being taken of the mechanical characteristics of the transmission.

According to the essential characteristic of the present invention, the system includes at least two shafts or transmissions capable of transmitting the driving efforts, with certain torque or speed characteristics which are variable (at least for one of these two factors) within certain limits, and coupling means, interposed between these transmissions and a receiver shaft or other element, for receiving movement either from only one of these transmissions, transforming said movement, and applying it to the receiver shaft with characteristics different from the initial characteristics of this movement, in particular with higher torques, or from both of these transmissions when the conditions of operation make it possible without the torques which are then applied exceeding the values that can be supported by said transmissions.

Other features of the present invention will be evident from the following detailed description of some specific embodiments thereof.

Preferred embodiments of the present invention will be hereinafter described with reference to the accompanying drawings, given merely by way of example, and in which:

Fig. 1 is a plan view, partly in section, through the driving and receiver shafts, of a system including a driving source of power and a transmission device according to the invention for transmitting movements, with a range of variable speeds and torques, to a receiver shaft, this system being made according to a first embodiment;

Fig. 2 is a sectional view on the line II—II of Fig. 1;

Fig. 3 is a sectional view on the line III—III of Fig. 1;

Fig. 4 is a diagrammatic side view corresponding to Fig. 1, the gears being shown merely by their pitch circles;

Fig. 5 is a plan view, partly in section, of a transmission system according to the invention made according to another embodiment;

Fig. 6 is a partial section on the line VI—VI of Fig. 5;

Fig. 7 is a diagrammatic side view corresponding to Figs. 5 and 6;

Fig. 8 is an elevational view of the essential elements of a change speed device of the continuous type adapted to be applied, according to the invention, to the transmissions which constitute the chief object of the invention.

The invention is intended to provide means for transmitting a driving power to a receiver shaft with variable torques and speeds.

For the sake of clarity we will first consider the case in which the motive power is supplied by engines adapted to run within determined ranges of speed, with torques variable within restricted limits, which is the case of explosion or internal combustion engines. As a matter of fact, it should be understood from the following description that the choice of this particular case has no limitative character.

It is known that the solutions that have been proposed for obtaining a variable torque and ratio transmission generally consisted in making use of change speed devices of either of the two following types:

a. The non-continuous type, giving a limited number of gear ratios;

b. The continuous type, or gradual type, which provide, on the receiver shaft, speeds varying in a continuous manner from zero (at least theoretically) to a maximum.

In particular, when it is desired to obtain very important torques, for instance in the case of motor vehicles to be started under considerable load (lorries, automotive or other railroad vehicles, and the like) the above mentioned solutions are insufficient. The first of these solutions calls for a very great number of different ratios of transmissions, which involves mechanisms which are very cumbersome and necessitate complicated maneuvers. The second solution permits only theoretically of obtaining zero speed on the receiver shaft (which would correspond to torques of unlimited values) because the elements of these gradual working change speed devices can, for a given volume of the whole mechanism, work correctly only for torques lower than a limit value.

It has also been proposed, in order to increase the starting torques by reducing the speed, to interpose between the driving shaft and the final receiver element, not only a change speed box, but also a fixed speed reducing gear. However, it is clear that such a mechanism merely displaces the range of speeds that is obtained, without modifying the width thereof.

In order to meet the requirements of practice, and in particular, in order to obtain both very high torques when starting and a speed as high as possible when working under normal conditions, we proceed in the following manner according to the invention:

The driving force is transmitted to at least two primary receiver shafts or equivalent transmission means, with given torque and speed characteristics which, for at least one of said shafts, can be varied within predetermined limits (either by varying one of the torque and speed factors, or by varying both of them simultaneously).

Furthermore, between said primary receiver shafts and the final receiver shaft or output shaft, we interpose a coupling device capable either of receiving movement from only one of the primary shafts and transforming it to apply it to the output shaft with characteristics different from the input characteristics (and in particular with higher torques), or of receiving movement from both of said shafts when the working conditions, account being taken of the resistant torque, are or become such that the torque applied to the primary shafts do not exceed the values that can be transmitted by said shafts without danger of breaking.

Such a system permits, as it will be hereinafter explained, multiplying the torque on the final receiver shaft while reducing in the same proportion its minimum speed, and this without involving a corresponding reduction of the maximum speed of said output shaft.

In Fig. 1, we have diagrammatically shown a device according to an embodiment of the present invention, which can be adapted and is applied to the case in which a motor M drives, through change speed devices or gear boxes $H^1$ and $H^2$, for instance of the gradual type, as shown in applicants' prior application S. N. 113,073, filed November 27, 1936, two primary shafts $I^1$ and $I^2$ which are connected to the output shaft 2 through the above mentioned coupling system.

This last mentioned system can be made in many different ways, preferably consisting of a mechanism of the sun-and-planet wheel type. This mechanism may be an epicycloidal gear, or, as shown by the drawings, a hypocycloidal gear, and it includes the following elements:

a. A sun wheel 3, which is actuated by shaft $I^1$;
b. A set of planet wheels 4, carried by the receiver shaft 2; and
c. Orbit wheel 5, consisting for instance of a kind of box or drum and adapted, under some conditions, to be driven by shaft $I^2$, through any suitable transmission means, illustrated by the drawings (Figs. 1 and 4) in the form of a chain 6 coacting with pinions 7, 8 (the ratio of transmission of these means being either fixed or variable and on the drawing, equal to 1).

This system, made according to the above or any other equivalent embodiment, achieves the following results:

On the one hand, it reduces the speed of the movement applied, with a torque $C^1$, to sun pinion 3 by primary shaft $I^1$, and, consequently, it multiplies, proportionally, the torque $C^2$ applied by the planet wheels to the output shaft 2 (Fig. 4).

On the other hand, it makes it possible to bring into play, at the proper time, primary shaft $I^2$, in order to multiply the speed, transmission 6, 7, 8 being such that the orbit wheel is driven in the example illustrated in the same direction as the sun wheel, so that it is possible, when the speeds of the sun and orbit wheels come to be equal to each other, of obtaining a kind of direct drive between the two primary shafts $I^1$, $I^2$.

It will be noted that, in the drive of the above mentioned epicycloidal gear by the primary shaft $I^2$, the resistant torque applied thereto by said gear is equal to torque $C^3$ (Fig. 4). In view of the importance of this torque, the value of which, especially during the starting period, can exceed the limit that can be supported by shaft $I^2$, we provide means for bringing this last mentioned shaft out of action and releasing it from the action of said torque. These means consist, for instance, in the combination with the transmission gear of a free wheel device such as one way brake 13, 14 coacting with the orbit wheel (Figs. 1 and 2).

Therefore, it is that last mentioned device that will support torques $C^2$ or $C^3$ for the time during which said torques have very high values corresponding for instance to the starting periods of the whole. It will be readily understood that these values can be as high as it may be desired, since the reactions on device 13, 14 are static reactions and are applied to frame 15. The values of these torques are limited merely by the characteristics of shaft $I^1$, account being taken of the ratio of transmission or gear ratio of mechanism 3—4.

The operation of the whole of the transmission system according to the invention includes two successive steps, to wit:

a. A first step, used, in particular, for starting the device, during which the speeds and the torques of the output shaft, result from the combination of the first change speed device $H^1$, shaft $I^1$, and the speed reducing gear constituted by gear mechanism 3—4.

b. A second step, which begins when the resistant torque applied to device 13—14 drops below a value that can be supported by shaft $I^2$, during which step it is possible to pass into higher and higher gear up to a maximum corresponding to the combination of the two maximum ratios of devices $H^1$ and $H^2$, respectively (which ratios may be equal).

In order to increase safety, we may provide, on the primary shafts, free-wheel devices such as one way brake 16, 17 or the like (Figs. 1 and 3) which, in the case of too high a resistant torque being applied to the output shaft 2, transmit the reactions directly to frame 15.

It should be well understood that any suitable means may be provided for ensuring, under correct conditions, the passage from the first step to the second step, or inversely.

For instance, these means may act to lock the means for controlling the working of the second primary shaft $I^2$, or the gear box $H^1$ associated therewith, or to prevent the action of the corresponding source of motive energy, when torque $C^2$ or $C^3$ is too high.

The above mentioned means may also act to bring the second shaft $I^2$ automatically into or out of action.

Said means may be made and operated in many different ways. Merely by way of example, it is shown, on the drawings (Figs. 1 and 2) that said means make use of the reaction applied to one way brake 13, 14. This reaction, measured by a dynamo-metric device 18 is transmitted, for instance through hydraulic means, associated with a conduit 19 and a membrane 20, to a device 21 for locking lever 2I², through which gear box H² is operated. Reference numeral 21 designates a fork movable in the direction of the axis of bellows 20, namely, towards and away from locking lever 2I². Locking lever 2I² is movable in a plane at right angles to the direction of movement of fork 21. When too high a couple is present, the member 18 shown in Fig. 2 is driven downwardly, thus, through fluid circuit 19, to expand bellows 20. When bellows 20 are expanded the fork 21 is engaged with locking lever 2I², thus to hold the gears in box H² in non-drive position. When the couple operating on the member 18 falls below the maximum value allowed for shaft I², the member 18 moves upwardly and, through hydraulic circuit 19, contracts bellows 20 to release fork 21 from locking lever 2I². In this way, during the starting period, this lever cannot be displaced until the other gear box lever 2I¹ has been operated and torque C² or C³ has dropped below a suitable value.

Any other mechanical, pneumatic, or electric control devices may be employed for the same purpose.

It has been supposed, in the preceding description, that two primary shafts were employed, but it is clear that we might make use of a greater number of primary shafts. We have shown, by way of example, in Figs. 5 to 7 inclusive, a transmission system including three shafts I¹, I², I³, working in series, with two sun-and-planet gears. The first of these gears transmits movement to an intermediate receiver shaft 2¹ which plays, with respect to the second sun-and-planet gear, the same part as the primary shaft I² with respect to the first.

The second sun-and-planet gear has been illustrated as being of the type including two pinions 4 and 4¹ for each planet wheel, which makes it possible of obtaining a high ratio of speed reduction.

With such an arrangement, or with any other equivalent one, we obtain a system which multiplies considerably, on the one hand the range of speeds, without changing the maximum speed, and, on the other hand, the range of torques, in view of the mechanical resistance of the parts. In order fully to set forth the advantages of the invention, we will give some numeric examples relating to the case, above considered, of a motor coupled to two, or more, primary shafts.

*First example.*—It will be supposed that two primary shafts are provided and that the torques they are capable of supporting vary in a ratio of 4 to 1, for instance from 40 kgs. to 10 kgs., for a range of corresponding speeds from 250 revolutions per minute to 1,000 revolutions per minute. On the other hand, the epicycloidal gear is chosen with a ratio of ¾+1. In other words, when the orbit wheel is stopped, the set of planet wheels turns with a speed which is ⅕ of the speed of the sun wheel.

Under these conditions, the torque $C^2$ that is applied to the output shaft (Fig. 4) is equal to 5 times the torque $C^1$ applied to the sun-wheel. As for the reaction $C^3$ on the orbit wheel, it is equal to four times $C^1$.

Considering first shaft I¹ when its torque is maximum (40 kgs.) and its speed is minimum (250 revolutions), it will be seen that, owing to the epicycloidal gear, the output shaft 2 can receive: a torque of 40×5, that is to say 200 kgs.; and a speed of 250/5, that is to say 50 revolutions.

These conditions correspond to transferring to the orbit wheel a torque of 4×40, that is to say 160 kgs., which could not be accepted for shaft I², but one way brake device 13—14 acts in this case for transmitting this torque directly to frame 15.

This is the first step of operation, during which it is possible, by acting on the gear ratio of gear box H¹, of causing the speed of output shaft 2 to pass from 50 revolutions to 200 revolutions.

At this time, primary shaft I¹ turns at a speed of 1000 revolutions per minute and supports a torque of 10 kgs. It follows that the orbit wheel transmits a reaction of 10×4, that is to say 40 kgs. Now, this is the limit value of the torque that can be supported by primary shaft I².

The second gear box H² can be brought into action for gradually increasing the speed of shaft I². When this speed has reached its maximum value, that is say 1000 revolutions, and supposing that the ratio of transmission between said shaft and the orbit wheel is equal to 1, the speeds of the sun and orbit wheels are equal to each other, and also to the speed of the receiver shaft, to wit 1000 revolutions per minute.

Finally, the torques will have varied from 200 to 10 kgs., that is to say in the proportion of 20 to 1, while the initial proportion was merely 4 to 1. Also, the range of speeds will have varied from 50 to 1000 revolutions per minute, while originally it varied merely from 250 to 1000.

Besides, it should be noted that this increase of the ranges of the torques and of the speeds does not call for any interruption in the transmission.

Furthermore, it is important to note that the operation above described corresponds only to an example. We might also provide for the stopping of the sun-wheel from the time when the orbit wheel is brought into play, after which it would be again brought into action, when the orbit wheel reaches its maximum value. With such an arrangement, we would obtain a slightly different range of speeds.

Also, it is clear that we might provide speed reducing or speed multiplying gears between the orbit wheel and shaft I². Anyway, the maximum ratio to be provided between the sun-wheel and the orbit wheel would be the ratio of the maximum torque and the minimum torque that can be transmitted by each of the shafts.

The above calculations would apply to the case of more than two shafts, as illustrated by way of example by Figs. 5 to 7. Supposing for instance that the torques and the speeds of shafts I¹, I², I³ in the case of three shafts, are the same as those above mentioned, it will be seen that the intermediate receiver shaft 2¹, on the output side of the first epicycloidal gear, can transmit torques from 10 kgs. to 200 kgs. It follows that we may choose, for the second epicycloidal gear, a ratio of 200/10+1, that is to say 21. Under these conditions, the final receiver shaft is capable of transmitting a torque of 40×20, that is to say 840 kgs. The full range of torques, for the whole of the transmission, will therefore go from 10 to 840 kgs., and the range of speeds will go from ¼ to 1/84, still without interruption in the transmissions and without the maximum speed being influenced.

Concerning the means for obtaining the transformation of the speeds between the source of energy and the primary shafts I¹, I², etc., they can be made in any suitable manner, being, at will, of mechanical, electrical, hydraulic, or any other nature.

However, we preferably make use of change speed devices of the connecting rod type, and, more especially, of the change speed devices described in the Belgian Patent No. 412,795, filed Dec. 14, 1935.

We will now give a second numerical example corresponding to this application.

*Second example.*—The change speed devices of the type above described essentially include, as shown by Fig. 8, a plurality of sets of connecting rods or arms 26, 27, 28, 29, for instance four, actuated by the crank pins, placed at suitable angles with respect to one another, of a crankshaft 25 which drives the mechanism. Each set of arms acts on the receiver shaft through a free wheel device 30, 31, 32 of the type in which two surfaces 30 and 31 roll on each other, with a wedge 32 interposed between them and adapted to prevent rolling in one direction.

Therefore, if there are two receiver shafts, use is made of two series of four sets of arms as above described which, preferably, according to an arrangement set forth in a patent application filed at the same time as that above mentioned, namely, Patent No. 2,162,124, are mounted on the same crankshaft 25, each crank pin of the latter acting on two connecting rods 26, etc. belonging respectively to said sets.

The speed variation is obtained by displacing the pivots 33 of the coupling crank 27, which pivots are for instance guided circularly by means of levers 34. Supposing that the variation is obtained manually, the two hand levers $21^1$ and $21^2$ of Fig. 1 would serve to operate separately the pivots 33 of the two sets of connecting rods.

With such an arrangement, and supposing for instance that, on the one hand, the one-way brake devices of the two speed reducing sets are capable of supporting each, dynamically, 400 kgs., and that, on the other hand, motor M develops 40 H. P. at a speed of revolution of 1440 revolutions per minute, which corresponds to a driving torque of 20 kgs., it will be seen that the maximum speed reduction, under full power is, for each receiver shaft $1^1$ or $1^2$, $20/400$, or $1/20$, or 0.05.

As, in connecting rod systems of the kind in question, the highest speed of the receiver shaft is generally, for instance, 0.4 times the motive speed, it will be seen that the range of speeds goes from $1,440 \times 0.4$ to $1,440 \times 0.05$, that is to say from 576 revolutions to 72 revolutions.

Therefore, if shafts $1^1$ and $1^2$ were merely directly coupled together, we could transmit to the output shaft 2 a maximum torque of 800 kgs. $(2 \times 400)$ with said range of speed (from a minimum value to 8 times said minimum value).

If now use is made of an epicycloidal train as above described, with a ratio of $8/1+1$ ($1/9$ of revolution of the planet wheels for one revolution of the sun-wheel) it is found that the range of speeds which can be obtained in two successive steps, as above explained, is nine times greater (that is to say from 576 revolutions to 8 revolutions), the maximum torque that can be transmitted to the output shaft 2 being itself $400 \times 9$, that is to say 3,600 kgs.

The above examples have been given merely by way of example, and, in a general manner, the invention would apply to any combination of the kind above described, provided between at least two primary shafts, for which:

1. Supporting that their torques would be equal, unequal or variable, their respective speeds would be:
  a. Either equal and constant;
  b. Or different and constant;
  c. Or variable for only one of the shafts;
  d. Or variable for more than one shaft;
  e. Or variable for all the shafts; and,
2. Supposing that their speeds are equal, unequal or variable, their torques would be:
  a. Either equal and constant;
  b. Or different and constant;
  c. Or variable for only one of the shafts;
  d. Or variable for one of the shafts only;
  e. Or variable for all the shafts.

On the other hand, it should be well understood that, in order to transmit to shafts $1^1$, $1^2$, etc. said torques and speeds, we may have recourse to the following means:

1. As above supposed, the combination of at least one source of energy (internal combustion engine, steam engine, electric motor, hydraulic motor, etc.) and change speed devices or intermediate receivers themselves of any suitable type (mechanical electrical, hydraulic, or other devices);
2. Or directly one or several sources of energy of any type whatever;
3. Or the combination of the two above mentioned arrangements, one of the primary shafts being for instance driven by an engine, and the other by an intermediate receiver which is actuated either by the same engine or by another engine.

In any case, the systems according to the invention make it possible, whenever it is necessary, to absorb the reactions independently of the organs placed before the sun-and-planet wheel gears or the like.

In any case, whatever be the particular embodiment that is chosen, it is possible, according to the present invention, to transmit energy with a range as wide as possible both as to the torque and the speed of the output shaft or shafts.

It will be readily understood that such an invention can be given many different applications and that it will be particularly interesting when the inertia per HP, that is to say the weight that is to be moved, in the case of vehicles, is of high value, or again when the starting torques are of considerable value as compared to the normal working torques.

For instance, in particular, the invention is especially well adapted to the traction of vehicles, either road vehicles or track vehicles, such for instance as railroad automotive cars.

In all cases, it will be possible to obtain the desired starting torque, without the maximum speed of the vehicle being reduced, and without requiring the use of gear-wheel speed reducing gears, the operation of which is always complicated because of the synchronism which is to be obtained in their case between their operation, that of the clutch and that of the engine.

It should further be noted that, in all the cases in which a disengagement of cooperating gears or clutches is to take place under load, the invention has another advantage, to wit the power to be disengaged is lower, since it is possible to act only on one of the primary shafts, that is to say on a load which is only a portion of the load acting upon the final receiver shaft.

In a general manner, while we have, in the above description, disclosed what we deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What we claim is:

1. In a transmission mechanism, a fixed support, a driving member, a first change speed mechanism, a second change speed mechanism, a driven member, reduction means connecting said first change speed mechanism and said driven member, said reduction means including a reaction element tending to move in one direction when said first change speed mechanism drives said driven member, gearing connecting said reaction member and said second change speed mechanism for rotation of said reaction element in another direction to drive said driven member, and means transmitting the reaction forces from said reaction element to said fixed support when said element tends to move in said one direction.

2. A device of the type described for driving a receiver member, which comprises, in combination, a stationary frame, at least two separate means for transmitting driving under given torque and speed conditions, at least one of said means being adapted to permit variations of at least one of said two factors, intermediate means, adapted to be driven either by both of said transmission means or by only one of them, for actuating said receiver member, means for transmitting reactions from said intermediate means to said frame when said intermediate means are driven by only one of said transmission means, means for controlling the other transmission means, and means operative by said reaction transmitting means for automatically holding said control means in inoperative position as long as the reaction transmitted by said reaction transmitting means exceeds a given value.

3. A device of the type described for driving a receiver member from a motor, which comprises, in combination, a stationary frame, at least two separate shafts adapted to be driven by said motor, a change speed device interposed between said motor and each of said shafts, a sun and planet-wheel system including three elements journalled in said frame, said elements comprising a sun wheel, an orbit wheel, and a planet-wheel carrier having planet-wheels journalled on said frame and interposed between said wheels, respectively, one of the first two mentioned wheels being rigidly coupled with one of said shafts, means for coupling one of the remaining two elements with said receiver member, means for coupling the third of said three elements with the other shaft, a one way brake device interposed between the last mentioned of said three elements and said frame to prevent said third element from turning in the direction opposed to that in which it is to be driven by the shaft with which it is associated, means for controlling the change speed device associated with said last mentioned shaft and means operative by said one way brake device for automatically holding said control means in inoperative position as long as the reaction supported by said one way brake device exceeds a given value.

4. A device of the type described for driving a receiver member, which comprises, in combination, a stationary frame, three transmission means for transmitting driving power under given torque and speed conditions, at least one of said means providing variations of at least one said two factors, a shaft, intermediate means adapted to be driven selectively either by two of said transmission means or by only one of them, for actuating said shaft, means for transmitting reactions from said intermediate means to said frame when said intermediate means are driven by only one of said transmission means, other intermediate means adapted to be driven selectively either by said shaft and the third transmission means respectively or by only said third transmission means and means for transmitting reactions from said last mentioned intermediate means to said frame when said last mentioned intermediate means are driven by only said third transmission means.

5. A device of the type described for driving a receiver member from a motor, which comprises, in combination, a stationary frame, three separate primary shafts adapted to be driven by said motor, at least one change speed device interposed between said motor and one of said shafts, a sun-and-planet wheel system including three elements journalled in said frame, said elements comprising a sun wheel, an orbit wheel, and a planet-wheel carrier having planet-wheels journalled on said carrier and interposed between the first two mentioned wheels, one of said first two mentioned wheels being rigidly coupled with one of the two first mentioned shafts, a secondary shaft, means for coupling one of the two remaining elements with said secondary shaft, means for coupling the third of said three elements with another of said first mentioned shafts, a one way brake interposed between the last mentioned of said three elements and said frame to prevent said last mentioned element from turning in the direction opposed to that in which it is driven by the shaft with which it is associated, another sun-and-planet wheel system including three elements journalled in said frame, the last-mentioned elements comprising a sun wheel, an orbit wheel, and a planet wheel carrier having planet wheels journalled on said carrier and interposed between the last-mentioned orbit and sun wheels respectively, one of said last mentioned wheels being rigidly coupled with the third of said primary shafts, means for coupling one of the two remaining last mentioned elements with said receiver member, means for coupling the third of said last mentioned three elements with said secondary shaft, and a one way brake device interposed between the last mentioned element and said frame to prevent said last mentioned element from turning in the direction opposed to that in which it is to be driven by the shaft with which it is associated.

LEO ROBIN.
MATHIEU van ROGGEN.